Figure 3:
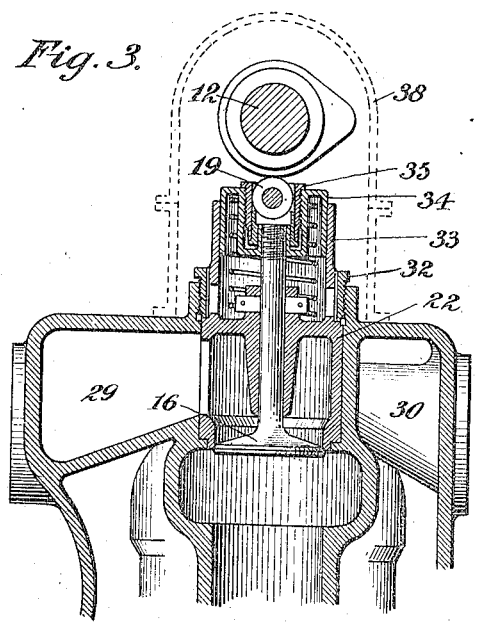

G. FORNACA.
COMBUSTION ENGINE.
APPLICATION FILED FEB. 23, 1911.
1,157,769.
Patented Oct. 26, 1915.
2 SHEETS—SHEET 1.
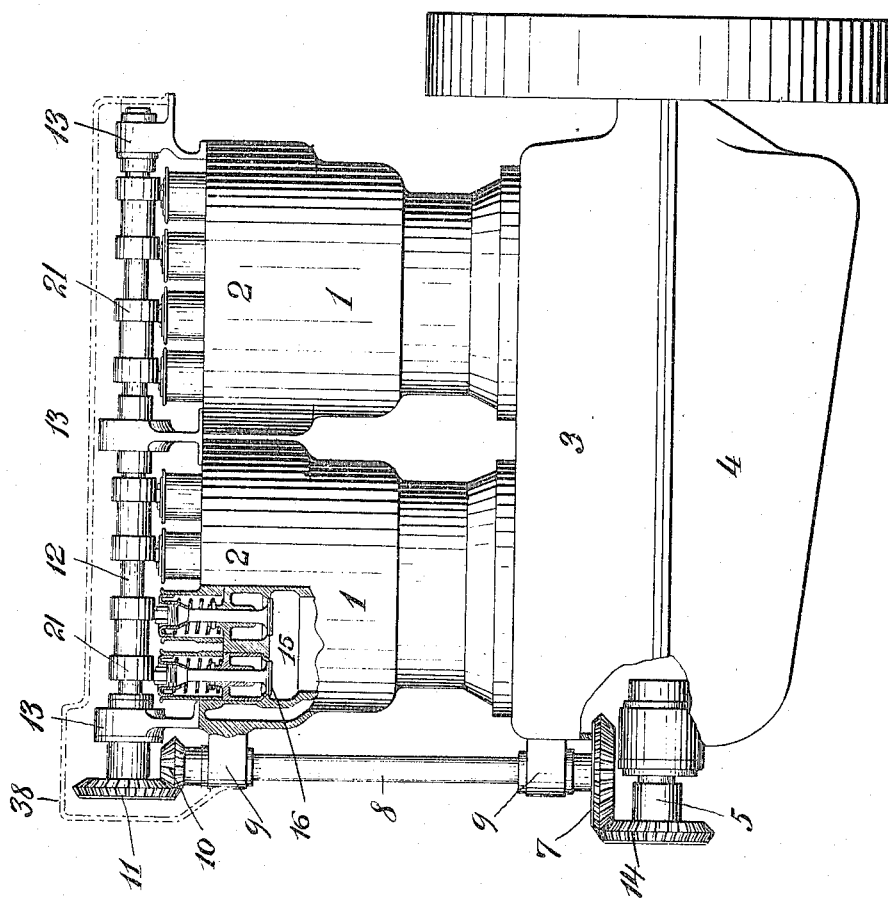
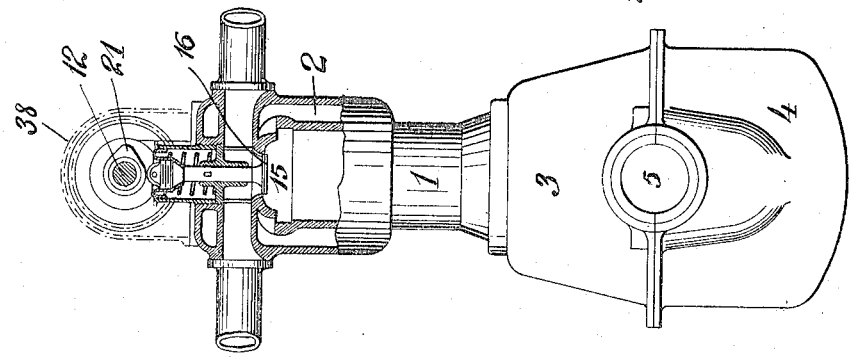

G. FORNACA.
COMBUSTION ENGINE.
APPLICATION FILED FEB. 23, 1911.

1,157,769.

Patented Oct. 26, 1915.
2 SHEETS—SHEET 2.

Witnesses:
Edith E. Galloway
Edmund O. Dubocq.

Inventor:
Guido Fornaca,
by Edwards, Sager & Wooster,
Attorneys.

UNITED STATES PATENT OFFICE.

GUIDO FORNACA, OF TURIN, ITALY, ASSIGNOR TO F. I. A. T., A CORPORATION OF NEW YORK.

COMBUSTION-ENGINE.

1,157,769.

Specification of Letters Patent.

Patented Oct. 26, 1915.

Application filed February 23, 1911. Serial No. 610,133.

*To all whom it may concern:*

Be it known that I, GUIDO FORNACA, a subject of the King of Italy, residing at Turin, Italy, have invented certain new and useful Improvements in Combustion-Engines, of which the following is a full, clear, and exact specification.

This invention relates to combustion engines, and more particularly has reference to means whereby the efficiency of high speed engines of the long stroke type may be increased, and also to provide an accessible valve mechanism which can be readily removed or adjusted.

The comparatively recent introduction of the so-called long stroke engine, that is, one wherein the stroke is greater than the diameter of the cylinder, has developed defects in engines of the heretofore commonly used overhanging type, wherein the valves are located at one or more sides of the cylinder in pockets extended from the compression spaces. These pockets provide a considerable dead space which is difficult to scavenge, and which reduces the purity of the explosive charge.

According to one feature of this invention, I propose to provide an engine having a cylindrical compression space of approximately the same diameter as that of the cylinder, and to place the inlet and exhaust valves in the cylinder head directly above the piston.

In disposing an inlet and an exhaust valve in the cylinder head, it will be seen that the largest possible diameter of either valve must be considerably less than the radius of the cylinder head, because space must be allowed for valve seats, partition walls, etc. Where a given volume of gas is to be passed at each movement of the valve, it will be seen that the distance the valve must be moved to fully open, will vary with the size of the valve. In a long stroke high speed motor, it is not only essential that the valve open and close quickly, but the clearest possible passage area must be provided at each operation. It is therefore desirable in such a motor to reduce the valve travel as much as possible without reducing the maximum open passage area, in order to attain the highest speed and the fullest efficiency.

In carrying out the invention, I propose to provide a maximum amount of valve area with a minimum amount of valve movement in a high speed long stroke motor, together with a compression space of approximately the same diameter as the cylinder, and thereby avoid the presence of all pockets, dead spaces, etc., in which burned gases might collect. To this end, I provide a plurality of inlet and exhaust valves in each cylinder, each being simultaneously operated from a cam shaft extending lengthwise of the engine on the top of the cylinders, and preferably inclosed within a dirt and sound proof casing. These four valves, while each of smaller diameter than a single large one, have about one and seven-tenths times the maximum permissible area of a single large valve, with about one half the length of stroke, so that not only can the large volume of gas required by a long stroke motor be supplied, but the valves, on account of their short movement, can be opened and closed at a very high rate.

A further feature of the invention is to provide an improved arrangement of valves and passages adapted to be used in all types of engines.

The invention will be more fully understood in connection with the description of the accompanying drawings, wherein—

Figure 4:
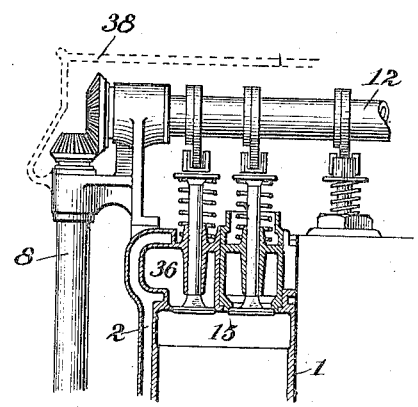
Figure 5:
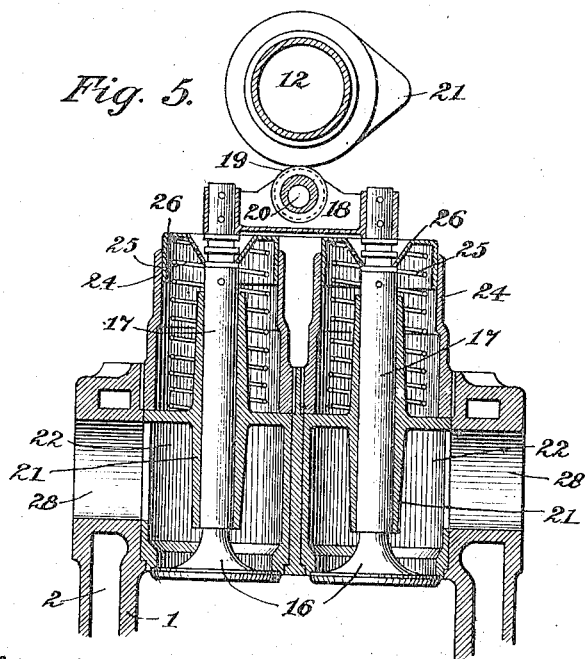
Figure 6:
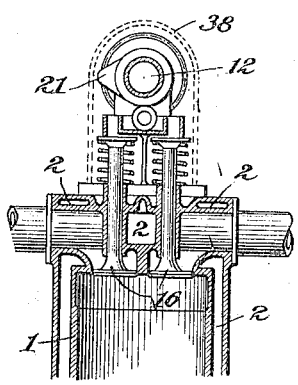

Figure 1 is a side elevation, partly in section, of an engine embodying the invention; Fig. 2 is an end elevation partly in section showing the mounting of the valve; Fig. 3 is a transverse section showing on an enlarged scale the detachable mounting of a valve and seat, together with the adjusting devices; Fig. 4 is a longitudinal section of one cylinder showing one of the inlet and exhaust valves; Fig. 5 is a transverse section on an enlarged scale, showing a pair of inlet or exhaust valves mounted to be simultaneously actuated, and capable of being removed with their seats through the head; and Fig. 6 is a section showing a slight modification.

1, 1 represent pairs of cylinders cast integrally, having water jackets 2 and mounted on a base 3 with detachable crank case 4, in which is journaled a main shaft 5 having a flywheel 6. These are of usual construction and need not be specifically described herein. At one end of the main shaft 5, and as herein shown at the front end, is a bevel gear wheel 14 meshing with a similar gear 7 carried by a vertical shaft 8, carried in bearings 9, 9. The shaft 8 carries at its upper end a small bevel gear 10, driving a gear 11 of twice the diameter carried on a cam shaft 12, which is journaled in bearings 13 on the heads of the cylinders.

15 represents the compression chamber, which, as will be seen in all of the figures, is substantially cylindrically formed and very slightly larger than the bore of the cylinder itself. Also, it will be seen that the top of the compression chamber may be rounded somewhat, as shown in Figs. 1 and 3.

In Figs. 1, 4, 5 and 6 are shown four valves to a cylinder, two being inlet valves and two being outlet valves, being respectively connected to the carbureter and to the exhaust pipe.

In Fig. 5, which shows the preferred construction, 16, 16 represent a pair of valves carried by stems 17 and connected by a rigid arm 18 carrying at its central portion roller 19, which is journaled on an adjustable eccentric shaft 20 carried by rigid arm 18. This shaft 20 will be suitably held so as to be capable of being rocked to bring the roller 19 in proper contact with the surface of cam 21, so that the valves can properly close at the same time. Each cylinder head is bored with four holes, in each of which is placed a valve casing 22 formed to have valve stem guides 23 rigid therewith. These valve casings 22, when properly positioned, are fastened down by hollow nuts 24 which thread into the cylinder casting and hold the valve casings rigidly in position.

25, 25 represent the valve springs which are adjusted as to tension by nuts 26 which slide in the upper ends of nuts 24 and thread on the valve stems 17 to adjust a tension of the spring. It will thus be seen that the hollow nuts 24, together with the sliding nuts 26, act as guides for the valves and resist any tendency to lateral movement there may be when the raised portion of the cams strikes the rollers 19. In order to take the valves out, it will be seen that the cam shaft 12 can easily be removed by unbolting bearings 13, and thereupon the valves can be removed with their seats in the valve casings 22 by unscrewing the nuts 24.

In Fig. 5, the passages 28, 28 may both be taken to represent exhaust or inlet passages, it being understood that the inlet passages are all interconnected, preferably in such manner as to bring all of the cylinders equally distant from the carbureter.

It will be seen that by reason of the large displacement of the piston in a long stroke motor, very large and unrestricted passage area must be provided, which is secured herein by the separate passages for each valve, and opening as herein shown on opposite sides of the engine.

The particular arrangement of exhaust and inlet passages is not made a particular feature of this application. In Figs. 2 and 3 single inlet and exhaust valves are shown, passage 29 being preferably an inlet passage heated by the water jacket 2, passage 30 being an outlet passage passing through the water jacket.

In Fig. 3, it will be seen that the valve casing 22 is held by a nut 32. 33 is a tubular telescoping nut, and 34 is the adjusting nut for adjusting the tension of the spring. 35 is a nut carrying the roller 19 and independently adjustable in nut 34 to regulate the contact of the roller with the cam.

In Fig. 4 is shown a section of the front cylinder in which the lefthand valve may be an exhaust valve and the righthand valve an inlet valve, there being similar valves, not shown, and both of the exhaust valves opening into a common large passage 36, which will lead rearwardly of the engine and be suitably connected to the other exhaust valves.

In Fig. 6 the valves are similarly arranged as in Fig. 5, except that water jacket space is provided between the valve stems as well as above the inlet and exhaust pipes. 38 represents a casing fastened to the cylinder heads and adapted to inclose the cams and valve lifts to protect them from dirt, and also to avoid the noise incident to high speed high power engines.

From the foregoing description it will be seen that very large passage area can be provided to each valve and consequently a very high engine speed attained, even where the stroke is much longer than the bore of the cylinder. According to this invention, as shown in Fig. 5, for instance, when increasing the inside diameter of the explosion chamber, each one of the two inlet valves, for instance, can have a chamber which is eighty five one hundredths (85/100ths) of the diameter which may be given a single valve, and two valves will then have a circumference of about one and seven-tenths ($1\frac{7}{10}$ths) that of the largest permissible single valve, and at a height corresponding to the diameter, a greater passage area. With a small valve it is not necessary to open it as wide as it would be a large valve, and consequently the linear movement of two small valves can be made very much less than could be that of a large valve. This is an important advantage in high speed engines where not only must the valves operate very quickly, but they must not restrict the passage of gas.

Various modifications and changes in the specific arrangements may be made, within the scope of the appended claims, without departing from the invention.

Having thus described my invention, I declare that what I claim as new and desire to secure by Letters Patent is,—

1. The combination with a circular cylinder head of predetermined area, of four puppet valves in said cylinder head having a combined area exceeding the maximum area of two puppet valves possible to be placed in said head area, and having a maximum movement less than that required to operate said two large valves, and means for operating said valves simultaneously in pairs, said four valves forming two sets, and means for simultaneously opening and closing like valves in timed relation to the strokes of the piston.

2. The combination with a cylinder head of predetermined area, of four puppet valves in said head having a total area exceeding the maximum total area of two puppet valves of larger respective diameters in said head, each of said four puppet valves having a full movement less than the full required movement of said two large puppet valves for equal opening, a shaft above said four puppet valves, means carried by said shaft for operating said valves, and means connecting said puppet valves in pairs.

3. The combination with a cylinder head of predetermined area, of four valves in said head having a total area exceeding the maximum total area of two valves of larger respective diameters in said head, each of said four valves having a full movement less than the full required movement of said two valves for equal opening, an operating shaft, and actuating connections for operating said valves in pairs, a shaft above said valves, means carried by said shaft for operating said valves, and means connecting said valves in pairs.

4. The combination in a combustion engine, with a plurality of cylinders each having a cylindrical compression space at the upper end, of four valves in the head of each cylinder, transversely extending bars connecting said valves in pairs, a roller carried by each bar, a shaft journaled on said cylinders above said rollers, and cams on said shaft for operating said pairs of valves.

5. The combination in a combustion engine, with a plurality of cylinders each having a cylindrical compression space at the upper end, of four removable valve seats and valves in the head of each cylinder, transversely extending bars connecting said valves in pairs, a roller carried by each bar, a shaft journaled on said cylinders above said rollers, cams on said shaft for operating said pairs of valves, and means for independently adjusting each valve.

6. In a combustion engine, the combination of a puppet valve disposed in the cylinder head, a cam shaft disposed above said valve, an actuating cam carried by said shaft, a yoke carrying a roller to be engaged by said cam for engaging and actuating the valve stem, said roller being eccentrically mounted in said yoke for regulating the contact between the said cam and said roller.

7. In a combustion engine, the combination of a plurality of puppet valves disposed in the cylinder head, said puppet valves being arranged in sets of two, and means for simultaneously opening and closing like valves in timed relation to the strokes of the engine, said means comprising a cam shaft disposed above said valves, and actuating connections for operating said valves in pairs, said actuating connections including an eccentrically mounted member for adjusting the normal closing position of the valves.

In testimony whereof I affix my signature, in presence of two witnesses.

GUIDO FORNACA.

Witnesses:
   PIERO GIANOLIO,
   ZEPP EMILI.